United States Patent
Wyatt

(10) Patent No.: US 7,631,122 B1
(45) Date of Patent: Dec. 8, 2009

(54) SYSTEM AND METHOD FOR FAST HARDWARE ATOMIC QUEUE ALLOCATION

(75) Inventor: David Wyatt, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 139 days.

(21) Appl. No.: 11/848,195

(22) Filed: Aug. 30, 2007

(51) Int. Cl.
*G06F 3/00* (2006.01)
*G06F 5/00* (2006.01)

(52) U.S. Cl. .......................................... 710/56; 710/52
(58) Field of Classification Search .................... 710/52, 710/56
See application file for complete search history.

(56) References Cited

U.S. PATENT DOCUMENTS

| | | | |
|---|---|---|---|
| 6,049,667 A * | 4/2000 | Bates | 717/138 |
| 6,728,834 B2 * | 4/2004 | Stone et al. | 711/118 |
| 6,854,025 B2 * | 2/2005 | Knight et al. | 710/22 |
| 7,404,060 B2 * | 7/2008 | Hoshina | 711/170 |

* cited by examiner

*Primary Examiner*—Alford W Kindred
*Assistant Examiner*—David E Martinez
(74) *Attorney, Agent, or Firm*—Patterson & Sheridan, LLP

(57) ABSTRACT

One embodiment of the invention sets forth a method for performing a queue allocation operation that includes receiving a memory address associated with a queue allocation aperture, where the memory address is read by a client to request memory space in a memory queue for a payload, computing a payload size based on the memory address, determining an insertion pointer for the payload based on a first position of a horizon pointer, where the insertion pointer indicates a location within the memory queue for the client to insert the payload, adjusting the horizon pointer to a second position based on the payload size, and returning the insertion pointer to the client. Such an approach enables multiple clients to advantageously request and obtain space within a shared memory queue in a single atomic operation, thereby allowing clients to share a memory queue more efficiently relative to prior art approaches.

20 Claims, 8 Drawing Sheets

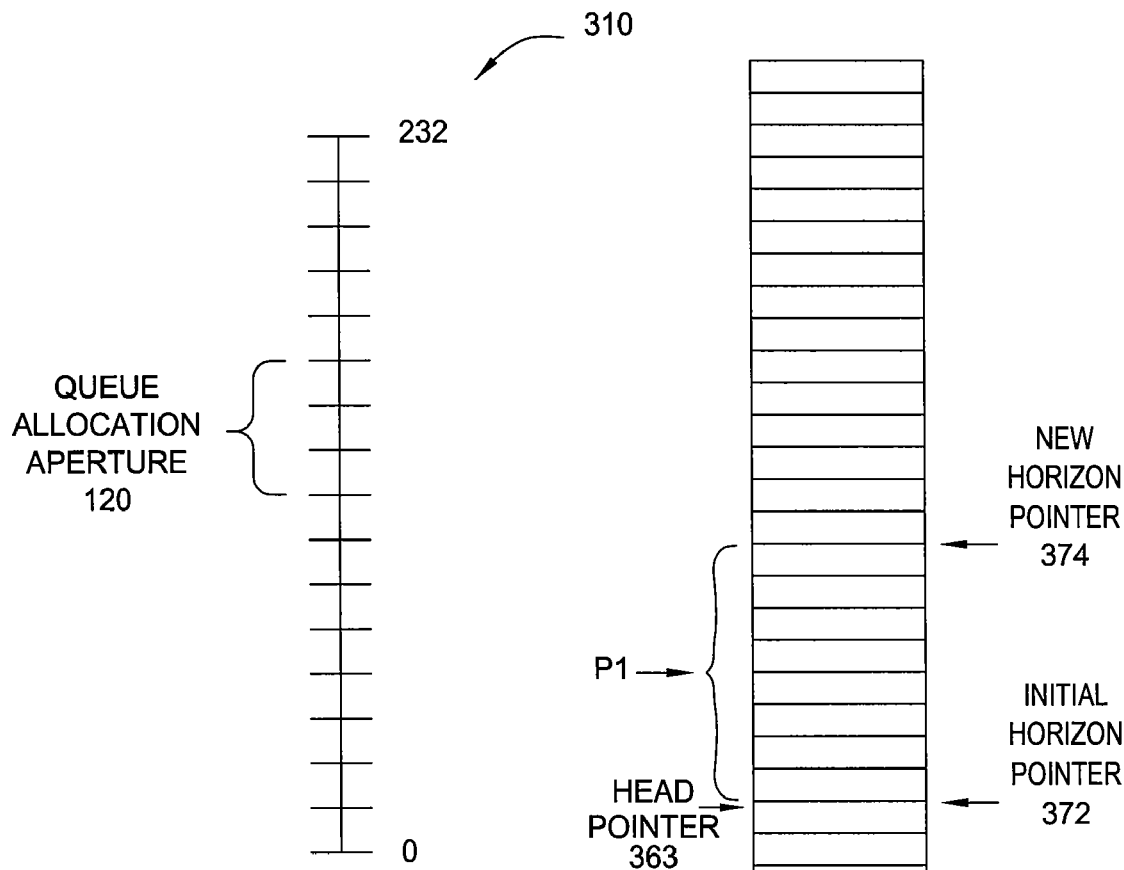
FIG. 3A
FIG. 3C
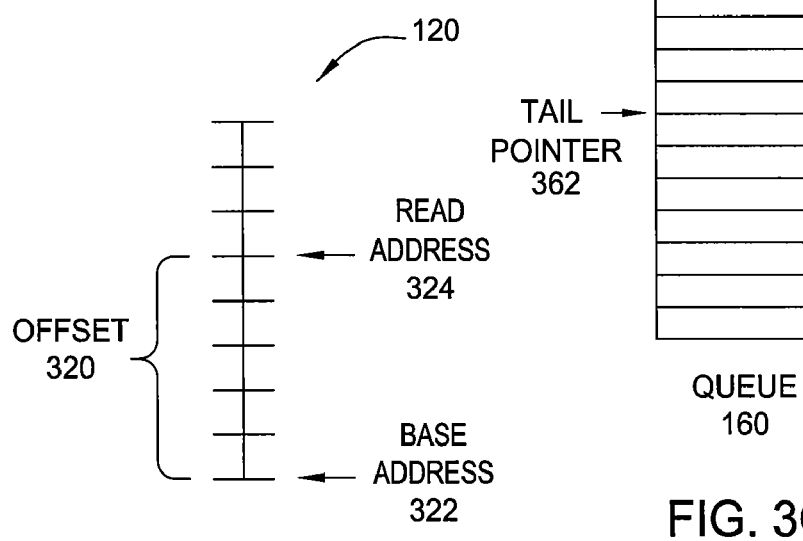
FIG. 3B

SYSTEM AND METHOD FOR FAST HARDWARE ATOMIC QUEUE ALLOCATION

BACKGROUND OF THE INVENTION

1. Field of the Invention

Embodiments of the present invention generally relate to storing data in computing devices and, more specifically, to system and method for fast hardware atomic queue allocation.

2. Description of the Related Art

Queues are convenient data exchange interfaces that allow clients within a computing system to submit commands and/or data for processing by a target engine or processor without having to wait for the hardware engine or processor to become idle. Decoupling the insertion and processing steps has the benefit of increasing the perceived processing speed in environments where clients submit requests in asynchronous bursts. A queue typically has a head pointer and a tail pointer. The tail pointer indicates the location of the last processed submission in the queue, as submissions are processed the tail pointer is incremented. The head pointer indicates the end of all currently unprocessed submissions in the queue, the target will continue processing commands and data in the queue until the tail equals the head. Generally, a software client (referred to herein as a "client") submits commands and/or data (referred to herein as a "payload") to a queue by performing three steps. In the first step, the amount of queue space available is determined by computing the difference between head pointer and end of queue, or in the case of a circular queue: between the head pointer and the tail pointer including any wrap around. If there is sufficient queue space to accommodate the client's payload, then, in the second step, the client obtains an insertion pointer indicating that the payload may be inserted into the queue starting at the location specified by the head pointer. These first two steps are commonly referred to as "queue allocation.". The last location after the insertion is termed the "horizon", this will become new head pointer after insertion is completed. Finally, in the third step, the client inserts the payload into the allocated space within the queue and updates the head pointer to the horizon location that immediately followed the new submission, and the queue controller continues processing insertions until tail equals the new head.

One problem with this approach, however, is that in computing systems that include multiple asynchronous clients, the three-step process of submitting payloads often may result in conflicts between different clients when those clients share a common queue. For example, consider the case where there are two asynchronous clients, A and B. Client A may perform a queue allocation operation and obtain an insertion pointer for its payload. In the time period before client A actually inserts or commits its payload, client B may perform its own queue allocation operation and obtain the same insertion pointer as the one granted to client A. Further, client B may insert its payload at the location designated by the insertion pointer ahead of client A and update the head pointer to a new value. As a result, an attempt by client A to insert its payload starting at the original head pointer either fails altogether or compromises the payload inserted by client B. Thus, in a system where multiple clients may work in parallel at the same or different processing levels and may have same or different privileges, the process of submitting a payload to the queue can become a race to commit the queue insertion and update the head pointer. Moreover, since different clients may share the same processing unit but do not necessarily share operating state or even the same operating system context, such as when operating within separate virtual machines, coordinating such a race between clients can be quite difficult.

One approach to eliminating conflicts between different clients is to include a queue for each client. However, this approach is expensive since the additional queues take up valuable die area and it does not solve the problem of client contention, simply moves it deeper into the processing system. A more common approach is to use mutual exclusion (commonly referred to as "mutex") algorithm over the entire queue allocation and payload submission process to allow only one client at a time access to the queue. Apart from the difficulty of creating a mutex that can be effectively used to co-ordinate between clients operating at different privilege levels or different virtual machines, the key drawback of this approach is that it will cause processing delays in each client until the mutex is released, thereby forcing a serialization of client requests and undermining the benefits of queues in decoupling multi-threaded, multi-processor systems. If the queue-mutex control is implemented in software, this forces operating system level serialization which further reduces the overall performance due to the software overhead.

As the foregoing illustrates, what is needed in the art is a queue allocation technique that avoids conflicts between multiple clients and is more efficient than prior art approaches.

SUMMARY OF THE INVENTION

One embodiment of the present invention sets forth a method for performing a queue allocation operation. The method includes the steps of receiving a memory address associated with a queue allocation aperture, wherein the memory address is read by a client to request memory space in a memory queue for a payload, computing a payload size based on the memory address, determining an insertion pointer for the payload based on a first position of a horizon pointer, where the insertion pointer indicates a location within the memory queue to store the payload, adjusting the horizon pointer to a second position based on the payload size, and returning the insertion pointer to the client.

One advantage of the disclosed method is that, by using atomic READ operation to obtain insertion pointers from a queue controller, multiple clients may request and obtain space within a shared memory queue without interrupting one another. Consequently, multiple clients may share a common memory queue in a manner that is more efficient than prior art approaches.

Another advantage of the disclosed method is that by retaining a horizon pointer to demark the upper limit of all queue insertion requests the queue processor may delay queue processing until prior clients asynchronously complete earlier request and commit their insertion operations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3B are conceptual illustrations of the queue allocation aperture, according to one embodiment of the present invention;

FIG. 3C is a conceptual illustration of the queue of FIG. 1, according to one embodiment of the present invention;

DETAILED DESCRIPTION

Figure 1:
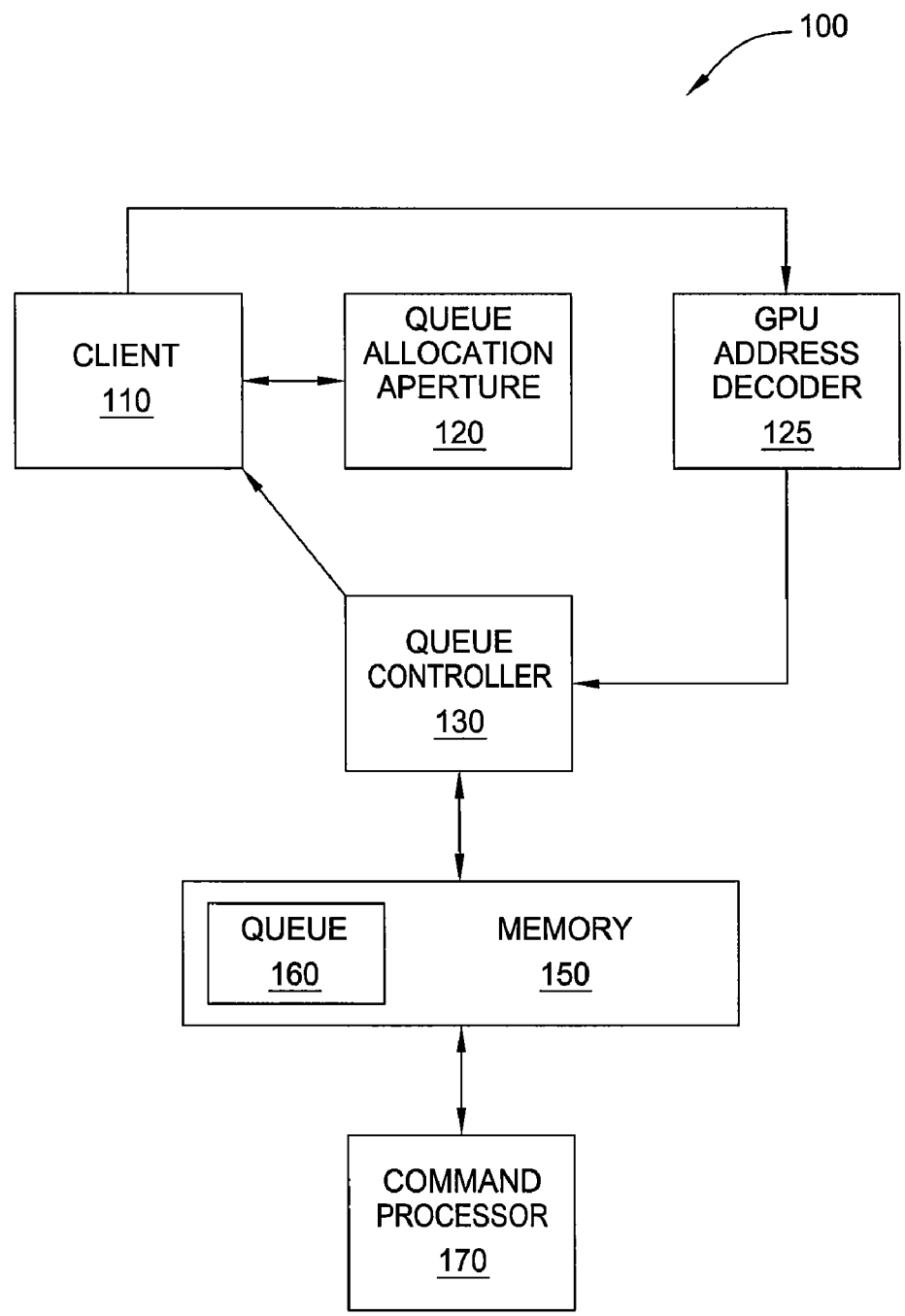
FIG. 1 is a conceptual illustration of a system configured to perform a queue allocation operation and to commit a payload to the allocated queue space, according to one embodiment of the present invention.

FIG. 1 is a conceptual illustration of a system 100 configured to perform a queue allocation operation and to commit a payload to the allocated queue space, according to one embodiment of the present invention. As shown, the system 100 includes, without limitation, a client 110, a queue allocation aperture 120, a GPU address decoder 125, a queue controller 130, a memory 150, which includes a queue 160, and a command processor 170. In general, the GPU address decoder 125, the queue controller 130 and the command processor 170 may reside within a GPU (not shown), and the memory 150 may be a memory local to the GPU, such as a frame buffer memory. As described in greater detail below in conjunction with FIGS. 3A and 3B, the queue allocation aperture 120 is a region of contiguous physical memory region within the overall memory space allocated to the GPU. The client 110 may be a software client, such as, for example, a software driver for a processing unit (e.g., the GPU) or a video basic input-output system (BIOS).

As described in greater detail herein, the client 110 is able to request space within the queue 160 to insert a payload by reading a specific memory address within the queue allocation aperture 120. In response to this read request, the queue controller 130 returns to the client 110 an insertion pointer setting forth the location within the queue 160 where the client 110 can insert the payload. As also described in greater detail herein, since each client queue space request is structured as an atomic read operation, a particular queue space request cannot be interrupted by a queue space request from a different client. Further, the queue controller 130 manages various queue pointers in a way that ensures that adequate queue space is allocated for the payload associated with each client queue space request. Thus, once a client initiates a queue space request for a given payload, the client is able to insert the payload into the queue 160 without conflicting with the payload from another client. Once the payload has been properly submitted to the queue 160, the command processor 170 proceeds to process the payload.

Figure 2:
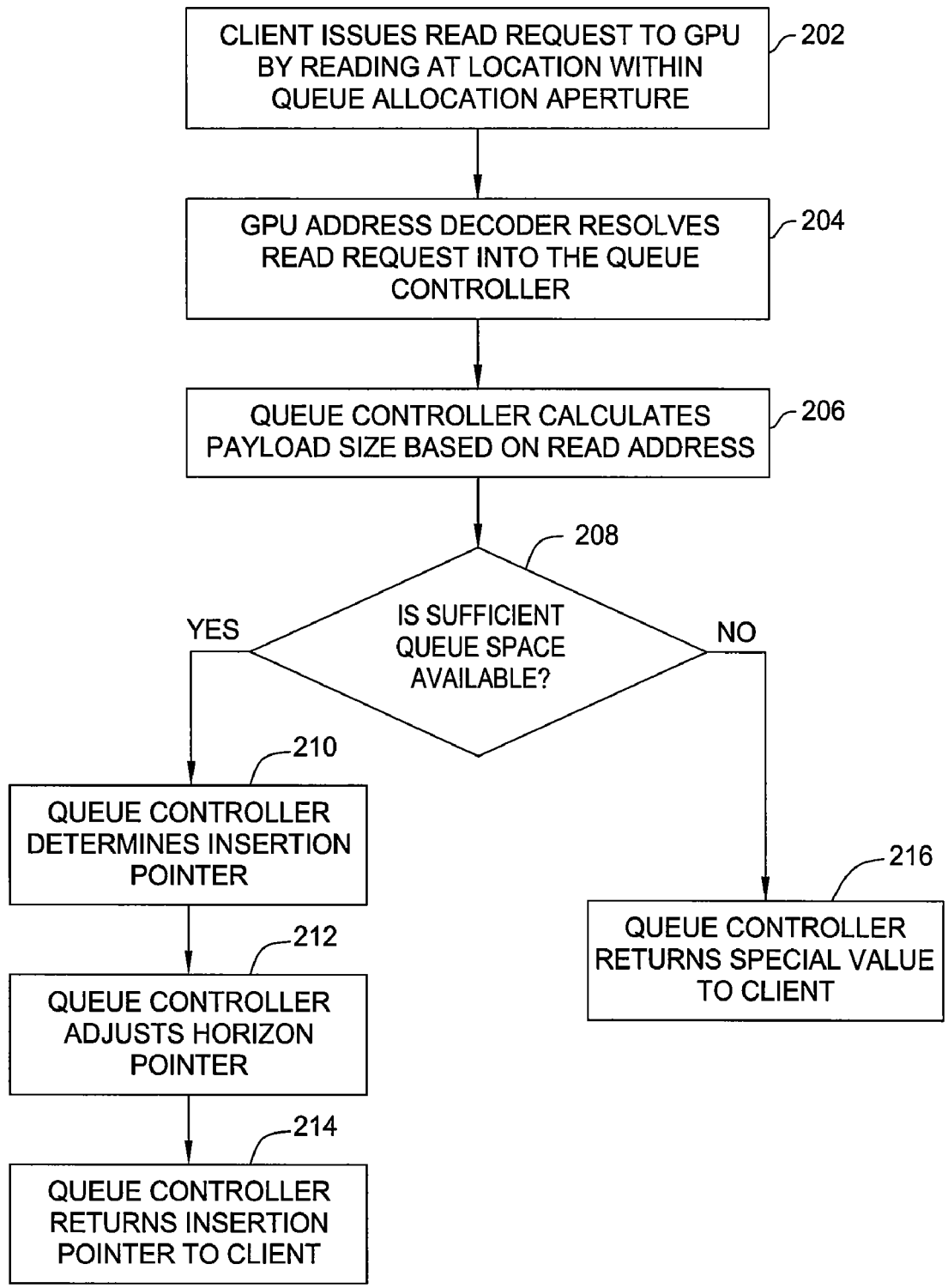
FIG. 2 sets forth a flow diagram of method steps for performing a queue allocation operation, according to one embodiment of the present invention.

FIG. 2 sets forth a flow diagram of method steps for performing a queue allocation operation, according to one embodiment of the present invention. Although the method steps are described in conjunction with the system 100 of FIG. 1, persons skilled in the art will understand that any system that performs the method steps, in any order, is within the scope of the invention.

The method begins in step 202, where the client 110 issues a request for queue space to the GPU by reading at a specific memory address within the queue allocation aperture 120. As shown in FIG. 3A, the queue allocation aperture 120 is an address range of contiguous physical memory within the overall memory space 310 allocated to the GPU. FIG. 3B is a conceptual illustration of the queue allocation aperture 120, according to one embodiment of the present invention. As shown, the structure of the queue allocation aperture 120 includes a base address 322. By knowing the base address 322, the client 110 is able to read into the queue allocation aperture 120 at a read address 324 that is offset from the base address 322 by an offset 320, which is equal to the size of the payload the client 110 wants to insert into the queue 160. For example, suppose the client 110 is requesting queue space for a payload that includes 3 commands, each 4 bytes in size, plus 128 bytes of data. The total payload size would be 140 bytes, which is 0x8C bytes (in hexadecimal). If the base address 322 is 0x40000000, then the client 110 would issue a request for queue space by reading at the location 0x4000008C within the queue allocation aperture 120. Persons skilled in the art will recognize that, since any such read address within the queue allocation aperture 120 reflects the size of a client's payload, the size of the queue allocation aperture 120 should be large enough to service the varying queue space requests from the different clients within the system 100.

In step 204, the GPU address decoder 125 resolves the queue space request from the client 110 into the queue controller 130. In step 206, upon receiving the read address 324, the queue controller 130 computes the size of the payload from the client 110 (indicated below as "P") using the read address 324 and the base address 322 as follows:

$$P = \text{ReadAddress} - \text{BaseAddress}$$

The method then proceeds to step 208, where the queue controller 130 determines whether sufficient queue space is available within the queue 160. If sufficient queue space is available, the method proceeds to step 210, where the queue controller 130 determines the insertion pointer. As previously described herein, an insertion pointer sets forth a location within the queue 160 where the client 110 can insert the payload. FIG. 3C is a conceptual illustration of the queue 160 of FIG. 1, according to one embodiment of the present invention. The queue controller 130 is configured to maintain a tail pointer 362 and a head pointer 363. As previously described herein, the tail pointer 362 indicates the end of all processed payloads in the queue 160 and the tail pointer 363 indicates the end of all currently unprocessed payloads. Importantly, the queue controller 130 is also configured to maintain a horizon pointer which indicates the end of the last queue allocation. Before queue space has been allocated to client 110, the horizon pointer is equal to the head pointer 363, as shown by an initial horizon pointer 372. Thus, in order to allocate queue space for the client 110 immediately after the last queue allocation, the queue controller 130 establishes an insertion pointer for the client 110 equal to the initial horizon pointer 372. In step 212, the queue controller 130 adjusts the initial horizon pointer 372 to reflect the queue allocation granted to the client 110 in step 210, i.e. the horizon pointer is adjusted to point after the new queue allocation and is shown in FIG. 3C as a new horizon pointer 374, and the space in the queue 160 between the new horizon pointer 374 and the initial horizon pointer 372 is equal to the size of the payload from the client 110. In this fashion, adjusted horizon pointer indicates, again, the end of the last queue allocation. The method then proceeds to step 214, where the queue controller 130 returns the insertion pointer to the client 110, thus completing the queue allocation operation.

If, in step 208, the queue controller 130 determines that the queue 160 is full or that the payload from the client 110 is larger than the available space in the queue 160, then the method proceeds to step 216. In step 216, the queue controller 130 returns a special value to the client 110 indicating that the queue space request has failed. The client 110 may then either resend the queue space request or adjust the request before resending it. In different embodiments, the special value may be, for example, 0 or −1.

Importantly, since reading an address into the queue allocation aperture 120, where the queue controller 130 returns an insertion pointer in response to that read operation, is intrinsically an atomic operation, the steps of requesting queue space for a client payload, determining and returning the insertion pointer for the client payload, and adjusting the horizon pointer to account for the client payload may be performed without interruption by other clients within the system 100. Thus, the queue controller 130 is able to process queue space requests serially as they appear on the bus between the CPU and the GPU, which ensures that adequate space in the queue 160 is allocated for each client payload. Further, as explained in greater detail below, since a particular client writes its payload to the address indicated by the insertion pointer received from the queue controller 130, and sufficient space has already been allocated in the queue 160 for that clients' payload, the client is able to write its payload into the queue 160 without conflicting with the payloads from any other client within the system 100.

Figures 4A, 4B:
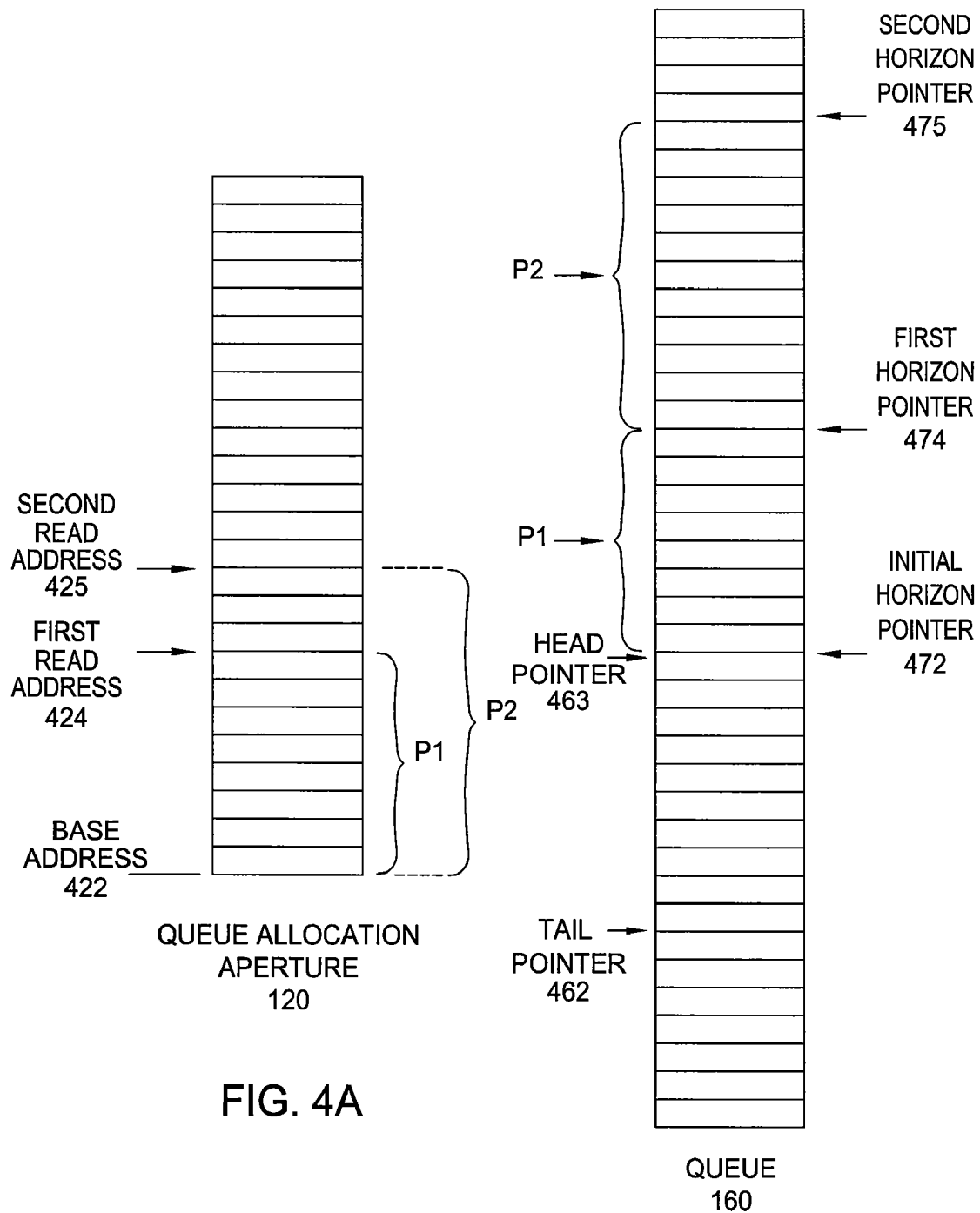
FIGS. 4A-4B illustrate how two different client queue allocation requests are processed, according to one embodiment of the present invention.

FIGS. 4A and 4B illustrate how two different client queue allocation requests are processed, according to one embodiment of the present invention. Consider a case where there are two asynchronous clients that are submitting payloads to the queue 160. As described in FIG. 2, by knowing the base address 422 of the queue allocation aperture 120, both clients are able to issue requests for queue space to the GPU by reading at specific memory addresses within the queue allocation aperture 120. By design of the system 100, the first queue space request on the bus between the CPU and the GPU is processed first. For the purposes of discussion only, it is assumed that the queue space request issued by the first client is the first request on the bus. Thus, as shown in FIG. 4A, the first client reads into the queue allocation aperture 120 at a first read address 424 that is offset from the base address 422 by an offset P1, equal to the size of the payload the first client wants to insert into the queue 160. Next, the GPU address decoder 125 resolves the queue space request from the first client into the queue controller 130, which computes the size of the payload from the first client using the first read address 424 and the base address 422 as follows:

$$P1 = \text{First ReadAddress} - \text{BaseAddress}$$

Once the size of the first client's payload is computed, the queue controller 130 determines if sufficient queue space is available in the queue 160 to accommodate the first client's payload. As shown in FIG. 4B, the queue 160 includes a tail pointer 462 and a head pointer 463. The tail pointer 462 indicates the location in the queue 160 of the last processed payload, and the head pointer 463 indicates the end of all currently unprocessed payloads. As previously described herein, before the queue controller 130 receives the queue space request from the first client, the horizon pointer indicating the end of the last queue allocation is equal to the head pointer 463, as shown by an initial horizon pointer 472. If the queue controller 130 determines that sufficient space is available in the queue 160 to accommodate the payload from the first client, then the queue controller 130 establishes an insertion pointer for the first client equal to the initial horizon pointer 472. Again, this insertion pointer indicates to the first client the address location in the queue 150 where the first client should submit its payload. The queue controller 130 then adjusts the initial pointer 472 to a first horizon pointer 474 to reflect the size of the first client's payload. In other words, the space in the queue 160 between the first horizon pointer 474 and the initial horizon pointer 472 is equal to the size of the payload from the first client (P1). Finally, the queue controller 130 returns to the first client the insertion pointer, which is equal to the initial horizon pointer 472. At this point, the queue allocation operation for the first client is completed, and the second client is allowed to read into the queue allocation aperture 120 at a second read address 425.

Similarly to the queue allocation operation for the first client, the second read address 425 is offset from the base address 422 by an offset P2, equal to the size of the payload the second client wants to insert into the queue 160. Subsequently, the GPU address decoder 125 resolves the queue space request from the second client into the queue controller 130, which computes the size of the payload from the second client using the second read address 425 and the base address 422 as follows:

$$P2 = \text{Second ReadAddress} - \text{BaseAddress}$$

Once the size of the second client's payload is calculated, the queue controller 130 determines if sufficient queue space is available in the queue 160 to accommodate the second client's payload. Before the queue controller receives the queue space request from the second client, the horizon pointer indicating the end of the last queue allocation is equal to the first horizon pointer 474. If the queue controller 130 determines that sufficient space is available in the queue 160 to accommodate the payload from the second client, then the queue controller 130 established an insertion pointer for the second client equal to the first horizon pointer 474. Again, this insertion pointer indicates to the second client the address location in the queue 160 where the second client should submit its payload. The queue controller 130 then adjusts the first horizon pointer 474 to a second horizon pointer 475 to reflect the size of the second client's payload. In other words, the space in the queue 160 between the second horizon pointer 475 and the first horizon pointer 474 is equal to the size of the payload from the second client (P2). Finally, the queue controller 130 returns to the second client an insertion pointer equal to the first horizon pointer 474. At this point, the queue allocation operation for the second client is also completed. In this fashion, the first and the second clients obtain different insertion pointers, each of which accounting for the queue space already allocated for other client payloads, thereby ensuring adequate queue space for each client payload.

Figure 5:
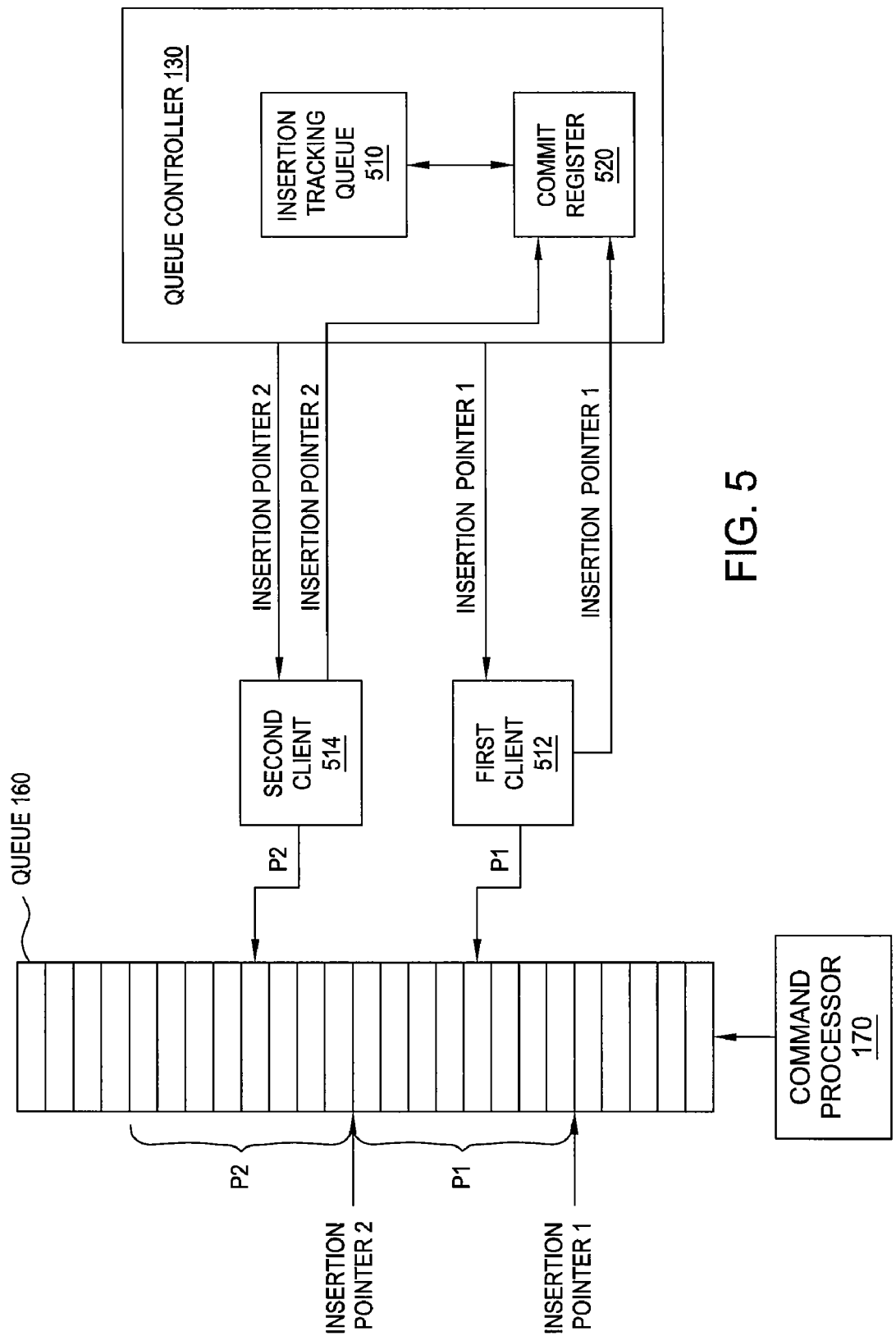
FIG. 5 illustrates how payload submissions from two different clients are tracked by the queue controller 130, according to one embodiment of the present invention.

FIG. 5 illustrates how payload submissions from two different clients are tracked by the queue controller 130, according to one embodiment of the present invention. As shown, the queue controller 130 includes, without limitation, an insertion tracking queue 510 and a commit register 520. In alternative embodiments, the insertion tracking queue 510 and the commit register 520 may each be located in system memory or any portion of memory allocated to the GPU.

For purposes of discussion only, consider a case where there are two asynchronous clients, a first client 512 and a second client 514, described in FIGS. 4A and 4B, that have obtained insertion pointers from the queue controller 130. The insertion pointer for the first client 512 is shown as an insertion pointer 1, and the insertion pointer for the second client 514 is shown as an insertion pointer 2. Once the insertion pointers are received, each of the first and second clients 512, 514 may write their payloads into the locations within the queue 160 beginning with the insertion pointer 1 and the insertion pointer 2, respectively, at any time. Thus, the queue controller 130 maintains the insertion tracking queue 510 in order to keep track of whether each client has written its payload into the queue 160.

Figure 6:
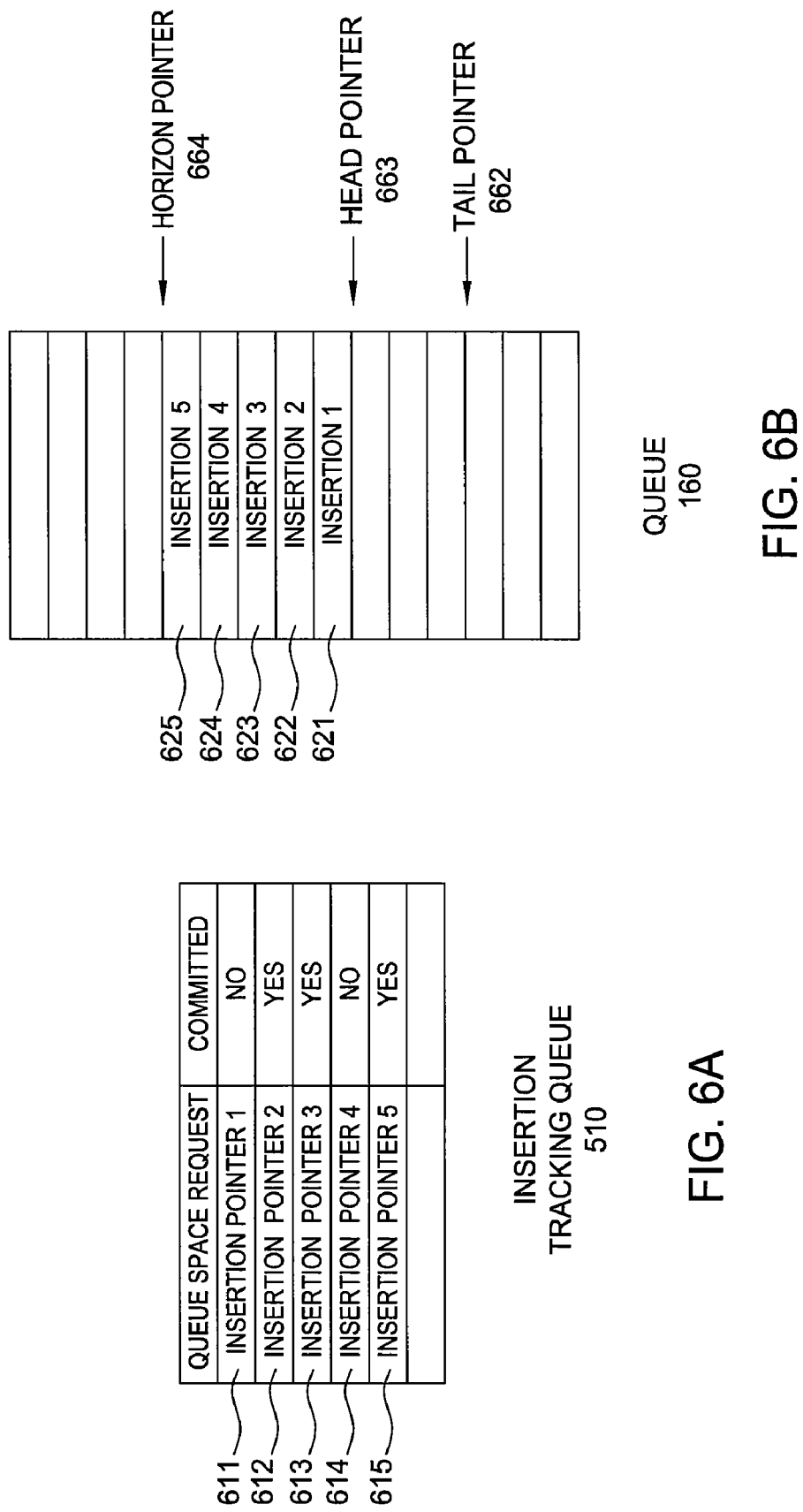
FIG. 6A is a more detailed conceptual illustration of the insertion tracking queue of FIG. 5, according to one embodiment of the present invention.
FIG. 6B is a conceptual illustration of the queue after queue space for the payloads of multiple clients has been allocated, according to one embodiment of the present invention.

As described below in FIG. 6A, the insertion tracking queue 510 stores the insertion pointer provided to a particular client as well as an insertion status indicating whether the client has committed its payload to the queue 160 for processing. The queue controller 130 stores the insertion pointers in the insertion tracking queue 510 in the same order that the queue controller 130 processes queue space requests from various clients. For example, since in the discussion of FIGS. 4A and 4B it was assumed that the queue space request issued by the first client 512 was the first request on the bus between the CPU and the GPU, the queue controller 130 enters the insertion pointer 1 into the insertion tracking queue 510 before entering the insertion pointer 2. As described below in FIG. 7, at any point in time, the queue space allocation request associated with the insertion pointer written into the insertion tracking queue 510 prior to all other insertion pointers in the insertion tracking queue 510 is referred to as the "lowest pending queue space request." Thus, if the insertion pointer 1 and insertion pointer 2 are the only insertion pointers in the insertion tracking queue 510, the queue space request associated with the insertion pointer 1 is considered to be the lowest-pending queue space request.

Once a client submits a payload to the queue 160, the client writes the insertion pointer associated with the payload to the commit register 520. When the queue controller 130 detects that the insertion pointer has been written to the commit register 520, the queue controller 130 updates the insertion status of the payload associated with that insertion pointer. As previously described herein, the command processor 170 is configured to process only payloads that reside within the queue 160 between the tail pointer and the head pointer. Since, as described in FIG. 7, the queue controller 130 adjusts the head pointer based on the insertion status of the lowest pending queue space request, the insertion tracking queue 510 and the commit register 520 are set up to ensure that the command processor 170 processes payloads that are located in consecutive memory locations within the queue 160, thereby increasing overall processing efficiency.

Referring back to the example of FIGS. 4A and 4B, it is also assumed that the second client 514 writes its payload into the queue 160 prior to the first client 512. Thus, after the second client 514 has written its payload to the queue 160 starting at the location specified by the insertion pointer 2, the second client 514 writes the insertion pointer 2 to the commit register 520. The queue controller 130 then changes the insertion status associated with the second insertion pointer 562 in the insertion tracking queue 510 to indicate that the second client 514 has written the payload associated with the second insertion pointer 562 to the queue 160 for processing. The same steps occur when the first client 512 writes its payload to the queue 160.

FIG. 6A is a more detailed conceptual illustration of the insertion tracking queue 510 of FIG. 5, according to one embodiment of the present invention. As shown in the first column, the insertion tracking queue 510 stores insertion pointers associated with queue space requests, shown as "insertion pointer 1" 611, "insertion pointer 2" 612, "insertion pointer 3" 613, "insertion pointer 4" 614, and "insertion pointer 5" 615, provided to first, second, third, fourth, and fifth clients, respectively, as a result of performing the queue allocation operations previously described herein. In this example, only five insertions have been illustrated in the insertion tracking queue 510 for the sake of clarity. In various implementations, any technically feasible number of insertion pointers may be included within the insertion tracking queue 510 at any point in time.

The second column of the insertion tracking queue 510 includes the insertion status of the client payload associated with each insertion pointer included in the first column of the insertion tracking queue 510. Again, the insertion status indicates whether a particular payload has been committed to the queue 160 for processing by the command processor 170. For the purpose of discussion only, it is assumed that the second, third, and fifth clients have committed their payloads to the queue 160, and the first and fourth clients have not. As described below in FIG. 7, the queue controller 130 adjusts the head pointer based on the insertion status of the lowest pending queue space request. In this example, it is assumed that the insertion pointers were stored in the insertion tracking queue 510 in numerical order, making the queue space request associated with the insertion pointer 1 611 the lowest pending queue space request within the insertion tracking queue 510.

FIG. 6B is a conceptual illustration of the queue 160 after queue space for the payloads of the clients in the example of FIG. 6A has been allocated, according to one embodiment of the present invention. As shown, the queue 160 includes, without limitation, a tail pointer 662, a head pointer 663, and a horizon pointer 664. Again, the tail pointer 662 indicates the end of all processed payloads in the queue 160, the tail pointer 663 indicates the end of all currently unprocessed payloads, and the horizon pointer 664 indicates the end of the last queue allocation. After the queue controller 130 has processed the queue space requests from the first, second, third, fourth, and fifth clients, the queue controller 130 adjusts the horizon pointer to a location shown as the horizon pointer 664 to the end of the queue space allocated for the payloads of these five clients. The head pointer 663 may then be updated, as described below, so that the command processor 170 can process these payloads.

Figure 7:
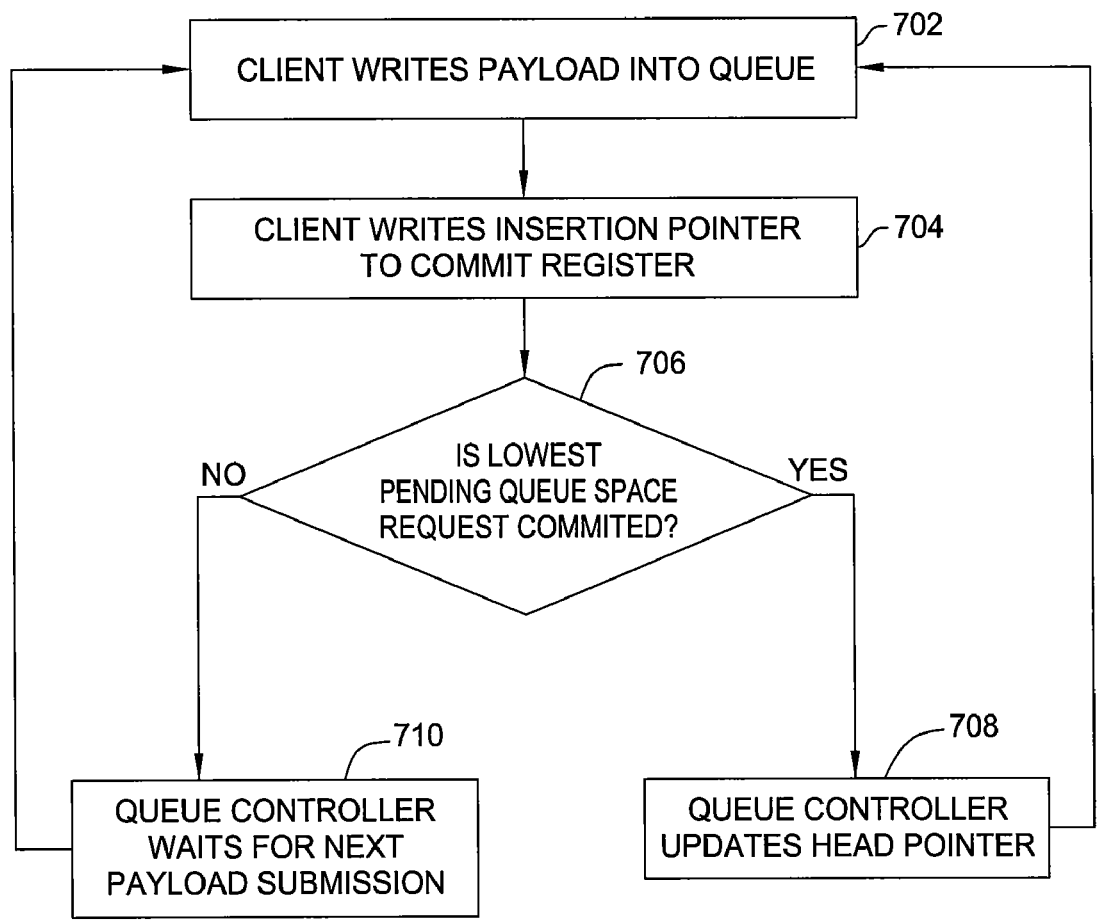
FIG. 7 sets forth a flow diagram of method steps for updating the head pointer within the queue, according to one embodiment of the present invention.

FIG. 7 sets forth a flow diagram of method steps for updating the head pointer within the queue 160 of FIG. 1, according to one embodiment of the present invention. Although the method steps are described in conjunction with the system 100 of FIGS. 1-6B, persons skilled in the art will understand that any system that performs the method steps, in any order, is within the scope of the invention.

The method begins in step 702, where the client 110 writes its payload into the queue 160 starting at the queue location specified by the insertion pointer received from the queue controller 130. In step 704, the client 110 writes the insertion pointer to the commit register 520 included in the queue controller 130. As previously described, writing to the commit register 520 indicates to the command processor 170 and the queue controller 130 that the payload has been submitted to the queue 160 for processing. As also previously described, since multiple other clients may request queue space before the client 110 commits its payload to the queue 160, the queue controller 130 includes an insertion tracking queue 510 to track the status of the different queue space requests received from various clients, as described in FIGS. 5 and 6A. In this case, the request for queue space associated with the payload that the client 110 committed to the queue 160 in step 704 may or may not be the lowest pending queue space request in the insertion tracking queue 510.

In step 706, the queue controller 130 reviews the status of the queue space request associated with each of the insertion pointers included in the insertion tracking queue 510 to determine whether the payload associated with the lowest pending queue space request has been committed to the queue 160 for processing. Again, the lowest pending queue space request is the request associated with the oldest insertion pointer included in the insertion tracking queue 510. For example, referring back to FIG. 6A, assuming that the insertion pointers were written to the insertion tracking queue 510 in numerical order, the queue space request associated with insertion pointer 1 611 would be the lowest pending queue space request. If the payload committed by the client 110 in step 704 is associated with the lowest pending queue space request, then the method proceeds to step 708. In step 708, the queue controller 130 updates the head pointer to a location in the queue 160 that reflects the end of the payload in the queue 160 associated with the lowest pending queue space request—here, the payload submitted by the client 110 in step 704. Adjusting the head pointer in this fashion allows the command processor 170 to the payload submitted by the client 110. The method then returns to step 702, described above.

If, however, in step 706, the queue controller 130 determines that the payload associated with the lowest pending queue space request has not yet been committed, then the method proceeds to step 710, where the queue controller 130 waits for the next payload submission from a client. For example, referring to back FIGS. 6A and 6B, since the second and third clients have committed their payloads to the queue 160, but the first client has not, the queue controller 130 waits for the payload insertion from the first client before updating the head pointer since the queue space request associated with the payload from the first client is the lowest pending queue space request in the insertion tracking queue 510. Once the first client inserts its payload and writes the insertion pointer into the commit register 520, the queue controller 130 updates the head pointer 663 to a location that reflects the end of the payload submitted by the first client (step 708). After step 710, the method returns to step 702, described above.

Figure 8:
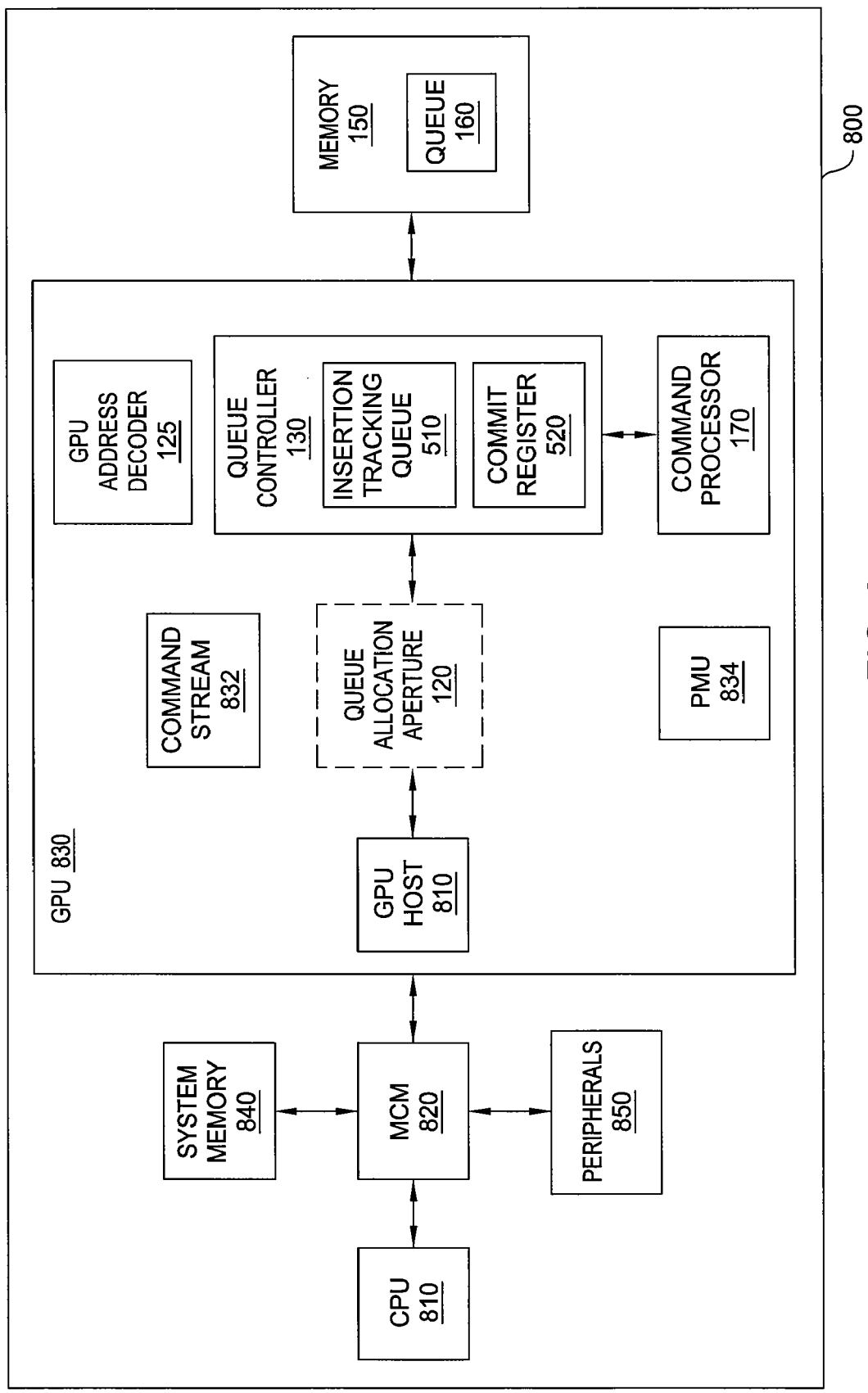
FIG. 8 is a conceptual diagram of a computing system configured to implement one or more aspects of the present invention.

FIG. 8 is a conceptual diagram of a computing system 800 configured to implement one or more aspects of the present invention. As shown, the computing system 800 includes, without limitation, a central processing unit (CPU) 810, a multi-chip module (MCM) 820, a graphics processing unit (GPU) 830, a system memory 840, peripherals 850, and the memory 150. The GPU 830 includes, without limitation, a command stream 832, a power management unit (PMU) 834, a GPU host 836, the queue allocation aperture 120 within the GPU memory 140, the GPU address decoder 125, the queue controller 130, and the command processor 170. The queue controller 130 further includes the insertion tracking queue 510 and the commit register 520. In addition, the queue 160 may be located within the system memory 840 or any other portion of the memory allocated to the GPU. In yet other alternative embodiments, the GPU may be any type of processing entity that interacts with the CPU.

One advantage of the disclosed systems and methods is that, by using atomic READ operation to obtain insertion pointers, multiple software clients may request and obtain space within a shared queue without interrupting one another. Furthermore, by using an internal tracking queue to track the queue space requests from different clients, the disclosed systems and methods enable clients to commit their respective payloads to the queue 160 asynchronously. As a result, multiple clients may share a common memory queue in a manner that is more efficient than prior art approaches.

Another advantage of the disclosed method is that by retaining a horizon pointer to demark the upper limit of all queue insertion requests the queue processor may track queue insertions 510 and delay adjusting the head pointer 663 and thereby queue processing, until prior clients asynchronously complete earlier request and commit their insertion operations forming a contiguous advance of committed insertions after which the head pointer 663 may be advanced.

While the foregoing is directed to embodiments of the present invention, other and further embodiments of the invention may be devised without departing from the basic scope thereof, and the scope thereof is determined by the claims that follow.

I claim:

1. A method for performing a queue allocation operation, the method comprising:
   receiving a memory address associated with a queue allocation aperture, wherein the memory address is read by a client to request memory space in a memory queue for a payload;
   computing a payload size based on the memory address;
   determining an insertion pointer for the payload based on a first position of a horizon pointer, wherein the insertion pointer indicates a location within the memory queue to store the payload;
   adjusting the horizon pointer to a second position based on the payload size; and
   returning the insertion pointer to the client.

2. The method of claim 1, wherein the queue allocation aperture includes a base address, and the payload size is the difference between the memory address and the base address.

3. The method of claim 1, wherein the client reads the memory address as part of an atomic read operation, and the steps of receiving the memory address, computing the payload size, determining the insertion pointer, adjusting the horizon pointer, and returning the insertion pointer occur without interruption from another client.

4. The method of claim 1, wherein the first position of the horizon pointer indicates a location within the memory queue at which memory space allocated for a payload associated with a previous queue allocation operation ends.

5. The method of claim 4, wherein the second position of the horizon pointer indicates a location within the memory queue at which memory space allocated for the payload ends.

6. The method of claim 1, further comprising the step of determining whether sufficient memory space exists in the memory queue for the payload.

7. The method of claim 6, further comprising the step of returning a special value to the client if sufficient space does not exist in the memory queue for the payload.

8. A processing unit configured to allocate memory space in a memory queue, the processing unit comprising:
   an address decoder; and
   a queue controller configured to:
      receive a memory address associated with a queue allocation aperture, wherein the memory address is read by a client to request memory space in the memory queue for a payload,
      compute a payload size based on the memory address,
      determine an insertion pointer for the payload based on a first position of a horizon pointer, wherein the insertion pointer indicates a location within the memory queue to store the payload, adjust the horizon pointer to a second position based on the payload size, and return the insertion pointer to the client.

9. The processing unit of claim 8, wherein the queue allocation aperture includes a base address, and the payload size is the difference between the memory address and the base address.

10. The processing unit of claim 8, wherein the client reads the memory address as part of an atomic read operation, and the queue controller receives the memory address, computes the payload size, determines the insertion pointer, adjusts the horizon pointer, and returns the insertion pointer without interruption from another client.

11. The processing unit of claim 8, wherein the first position of the horizon pointer indicates a location within the memory queue at which memory space allocated by the queue controller for a payload associated with a previous queue allocation operation ends.

12. The processing unit of claim 11, wherein the second position of the horizon pointer indicates a location within the memory queue at which memory space allocated by the queue controller for the payload ends.

13. The processing unit of claim 8, wherein the queue controller is further configured to determine whether sufficient memory space exists in the memory queue for the payload.

14. The processing unit of claim 13, wherein the queue controller is further configured to return a special value to the client if sufficient space does not exist in the memory queue for the payload.

15. The processing unit of claim 8, wherein the processing unit is a graphics processing unit.

16. The processing unit of claim 15, wherein the memory queue resides within a frame buffer memory coupled to the processing unit.

17. The processing unit of claim 8, wherein the client reads the memory address associated with the queue allocation aperture as part of a queue space request, and the address decoder is configured to resolve the queue space request into the queue controller.

18. A computing device configured to allocate memory space in a memory queue, the computing device comprising:

a client configured to read a memory address associated with a queue allocation aperture as part of a queue space request; and a processing unit that includes a queue controller configured to:

receive the memory address associated with the queue allocation aperture, compute a payload size based on the memory address, determine an insertion pointer for the payload based on a first position of a horizon pointer, wherein the insertion pointer indicates a location within the memory queue to store the payload, adjust the horizon pointer to a second position based on the payload size, and return the insertion pointer to the client.

19. The computing device of claim 18, wherein the processing unit is a graphics processing unit, and the memory queue resides within a frame buffer memory coupled to the processing unit.

20. The computing device of claim 19, wherein the client comprises a software driver for the processing unit or a video basic input-output system (BIOS).

* * * * *